(12) United States Patent
Hummel (10) Patent No.: US 8,327,557 B2
(45) Date of Patent: Dec. 11, 2012

(54) SAW GAUGE AND METHOD OF USING THE SAME

(75) Inventor: Richard M. Hummel, Parma, OH (US)

(73) Assignee: Woodpeckers, Inc., North Royalton, OH (US)

( * ) Notice: Subject to any disclaimer, the term of this patent is extended or adjusted under 35 U.S.C. 154(b) by 271 days.

(21) Appl. No.: 12/916,916

(22) Filed: Nov. 1, 2010

(65) Prior Publication Data

US 2011/0041351 A1 Feb. 24, 2011

Related U.S. Application Data

(63) Continuation of application No. 12/367,808, filed on Feb. 9, 2009, now Pat. No. 7,856,733.

(51) Int. Cl.
*B23Q 17/22* (2006.01)

(52) U.S. Cl. ........................................ 33/640; 33/641

(58) Field of Classification Search .................. 33/640, 33/641, 533, 633, 628, 626; 29/401.1, 407.01, 29/407.05; 83/477.2
See application file for complete search history.

(56) References Cited

U.S. PATENT DOCUMENTS

| | | |
|---|---|---|
| 2,710,633 A | 6/1955 | Oberg |
| 4,165,668 A | 8/1979 | McCord, Jr. |
| 5,097,601 A | 3/1992 | Pollak et al. |
| 5,121,553 A | 6/1992 | Boerder |
| 5,207,007 A | 5/1993 | Cucinotta et al. |
| 5,735,054 A | 4/1998 | Cole |
| 5,979,283 A | 11/1999 | Osborne |
| 6,195,905 B1 | 3/2001 | Cole |
| 6,237,457 B1 | 5/2001 | Taylor |
| 6,584,698 B1 | 7/2003 | Liu |
| 6,848,350 B2 | 2/2005 | Brazell et al. |
| 7,421,798 B2 * | 9/2008 | Pattee ........................... 33/640 |
| 7,856,733 B2 * | 12/2010 | Hummel ....................... 33/640 |
| 2008/0178486 A1 * | 7/2008 | Pattee ........................... 33/640 |
| 2011/0041351 A1 * | 2/2011 | Hummel ....................... 33/640 |

* cited by examiner

*Primary Examiner* — Yaritza Guadalupe-McCall
(74) *Attorney, Agent, or Firm* — Sand & Sebolt (57) ABSTRACT

A gauge for aligning a saw comprising a body having a bottom surface, a centering device adapted to fit within a miter gauge slot having various sizes, a cradle located on the centering device, and wherein the body bottom surface rests on the cradle during operation. A method of aligning a saw blade or a table fence comprising the steps of locating a centering device within a miter gauge slot, locating a cradle on the centering device, locating a body having a measurement portion and a counterweight on the cradle, adjusting the measurement portion to achieve a reference point, moving the centering device, the cradle, and the body along the miter gauge slot length to a second position, and obtaining a distance from the measurement portion as the body is moved along the miter gauge slot length.

27 Claims, 12 Drawing Sheets

SAW GAUGE AND METHOD OF USING THE SAME

CROSS-REFERENCE TO RELATED APPLICATIONS

This application is a Continuation of U.S. application Ser. No. 12/367,808 filed Feb. 9, 2009, the entire specification of which is incorporated herein by reference.

BACKGROUND OF THE INVENTION

1. Technical Field

The invention relates generally to alignment tools for cutting devices. More particularly, the invention relates to a consistent and precise device for aligning two objects so that they are parallel throughout their lengths. Specifically, the invention relates to a gauge for easily and efficiently aligning a table saw blade and table saw fence.

2. Background Information

A table saw is an efficient and simple way to precisely cut wood. The table saw provides flexibility in the size of the piece to be cut, as well as the angle the wood is cut on. To adjust the size of the finished product, a traditional table saw uses adjustable fences to vary the distance between the fence and the saw blade. While the fence remedies the problem of easily adjusting the length, it is sometimes difficult to perfectly align the fence parallel to the miter gauge slot. If the fence is not perfectly parallel, then the cut may not be straight as the user directs the wood along the fence.

Another potential issue is the alignment of the table saw blade. In particular, the table saw blade is adjustable for a variety of angled cuts. However, to produce an angle-free cut, the blade must be perfectly aligned. Since the blade is adjustable to virtually infinite positions, it can be extremely difficult to align the saw blade.

Traditionally, the process to perfectly align the table saw blade or the fence gate with the miter slot gauge was cumbersome, time-consuming, and required the use of several tools. A dial gauge with an extendable arm and magnetic base was generally used. First, the user would locate and turn on the magnet in a position to take measurements. Then, in order to make an adjustment, the magnet would have to be turned off and moved out of the way. After the adjustment, the user would once again take the same measurement and repeat the process as necessary.

Still another shortcoming was the difficulty in providing an accurate parallelism measurement between the length of the fence and the miter gauge slot. Particularly, the ability to measure small changes in the distance between the miter gauge slot and the fence requires that the measuring device maintain a consistent horizontal reference point. The inability to maintain the consistent horizontal reference point made the use of a dial gauge with an extendable arm and magnetic base impracticable.

Thus there is a long-felt need for a simple, effective, and tool-free device that can measure both run out of the table saw fence and the angle of the table saw blade.

SUMMARY OF THE INVENTION

The present invention broadly comprises a gauge for aligning a saw comprising a body having a bottom surface, a centering device adapted to fit within a miter gauge slot having various sizes, a cradle located on the centering device, and wherein the body bottom surface rests on the cradle during operation.

The present invention also broadly comprises a method of aligning a saw blade or a table fence comprising the steps of locating a centering device within a miter gauge slot, locating a cradle on the centering device, locating a body having a measurement portion and a counterweight on the cradle, adjusting the measurement portion to achieve a reference point, moving the centering device, the cradle, and the body along the miter gauge slot length to a second position, and obtaining a distance from the measurement portion as the body is moved along the miter gauge slot length.

BRIEF DESCRIPTION OF THE DRAWINGS

The preferred embodiments of the invention, illustrative of the best modes in which Applicant has contemplated applying the principles of the invention, are set forth in the following description and are shown in the drawings.

DESCRIPTION OF THE PREFERRED EMBODIMENT

At the outset, it should be appreciated that like drawing numbers on different drawing views identify identical, or functionally similar, structural elements of the invention. While the present invention is described with respect to what is presently considered to be the preferred embodiment, it is to be understood that the invention as claimed is not limited to the disclosed aspects.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

The saw gauge of the present invention is indicated generally at 16, as is particularly shown in FIGS. 1 through 14 located on a table saw 18, shown with a saw blade 20 and a table fence 22.

Figure 1:
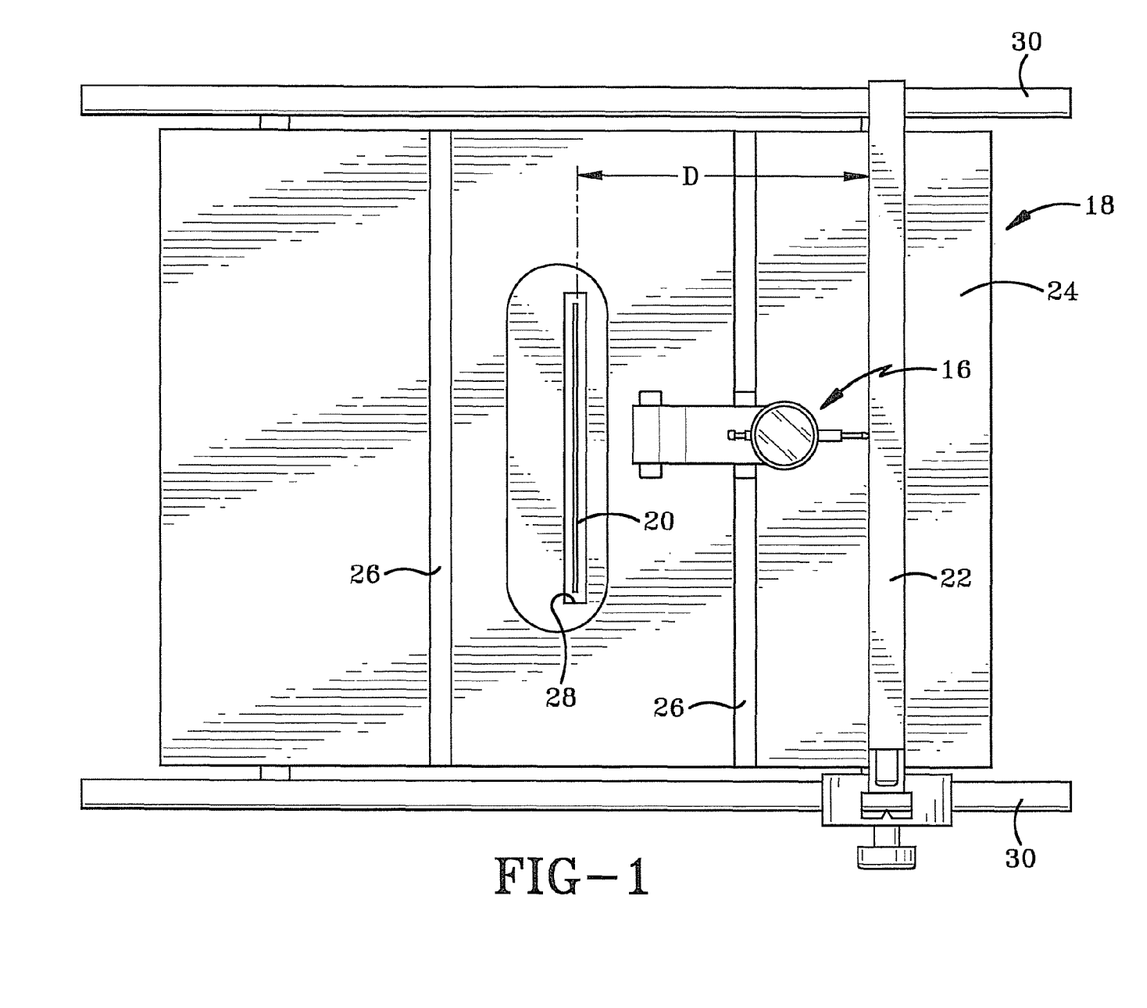
FIG. 1 is a top plan view of a preferred embodiment saw gauge measuring the alignment of a table fence.

As seen in FIG. 1, table saw 18 includes a work surface 24 defining a pair of miter gauge slots 26 and an opening 28. Both miter gauge slots 26 and opening 28 are preferably arranged across the width of the table so that miter gauge slots 26, opening 28, and table saw blade 20 are each parallel to one another. Table fence 22 is movable along mounting rods 30 so that a distance D between table fence 22 and table saw blade 20 may be easily adjusted.

Miter gauge slots 26 are preferably traditional and typical slots which are precision machined into the work surface by the manufacturer and provide a consistent alignment location. Further, opening 28 is also precision machined by the manufacturer with enough clearance to allow saw blade 20 be to adjusted in order to provide cuts on various angles, as well as make fine adjustments to the saw blade alignment.

Figure 2:
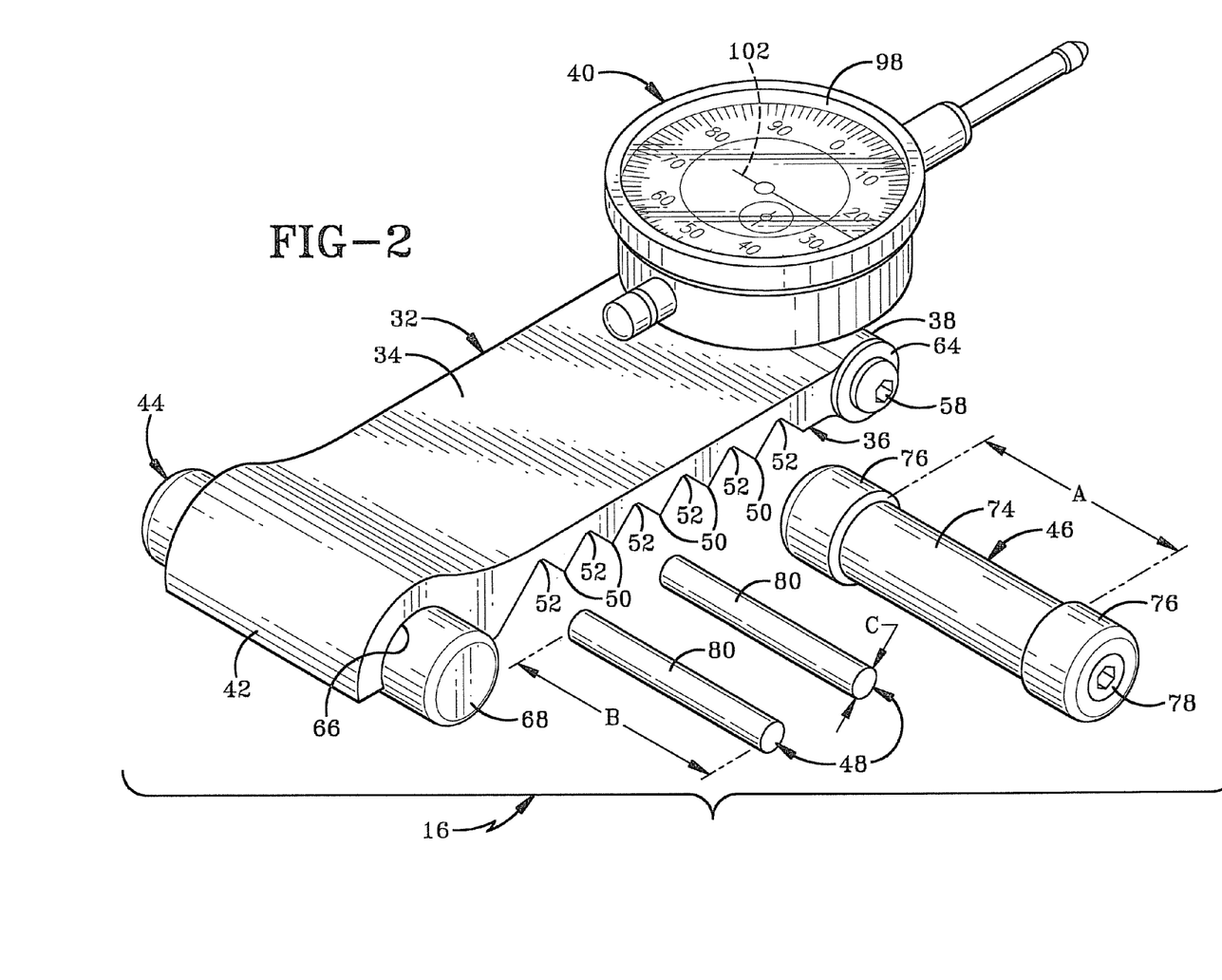
FIG. 2 is a perspective view of a preferred embodiment saw gauge with the components separated.
Figure 3:
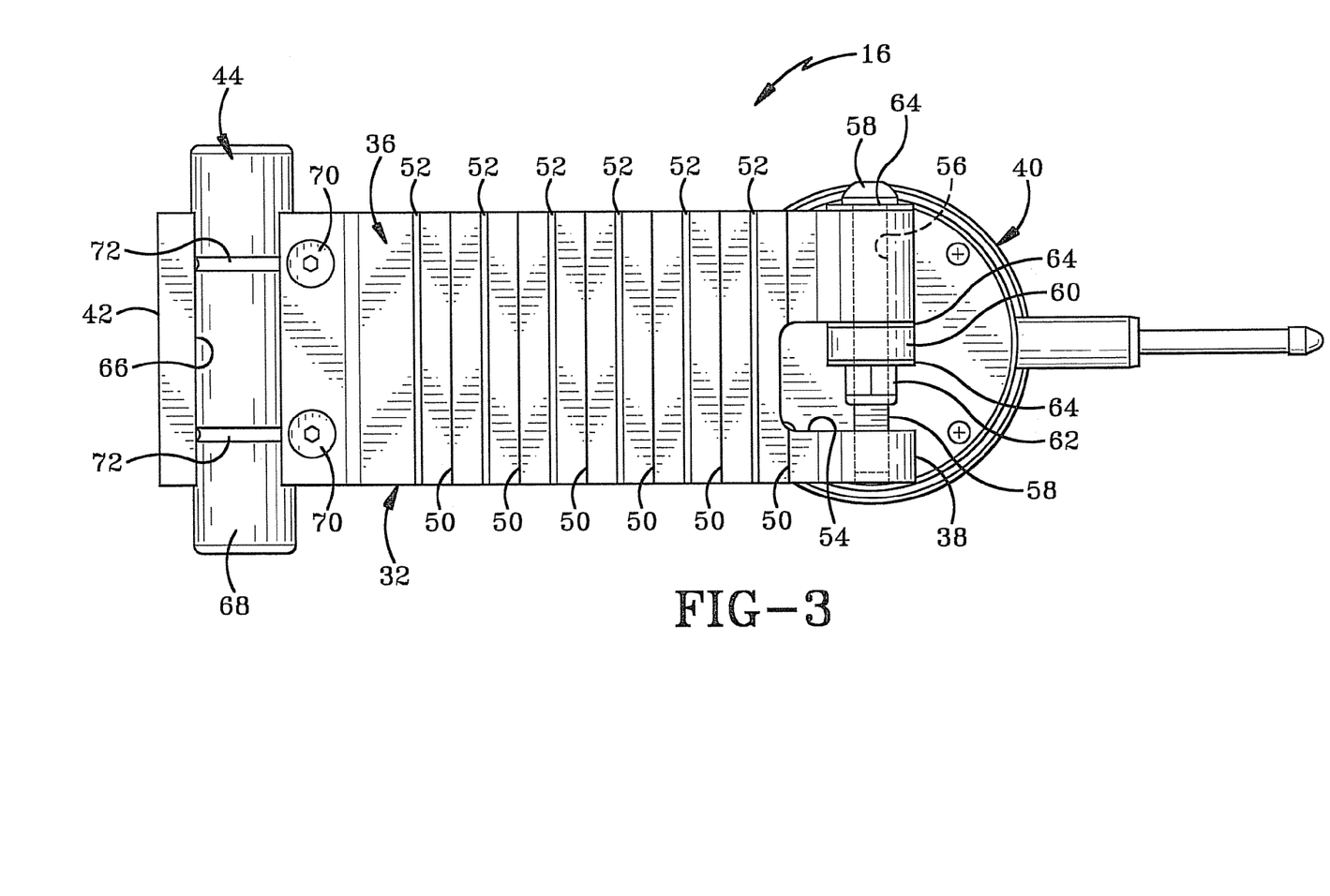
FIG. 3 is a bottom plan view of a preferred embodiment saw gauge.

FIG. 2 illustrates a perspective view of saw gauge 16, while FIG. 3 illustrates a bottom view of the saw gauge. In accordance with one of the main features of the invention, saw gauge 16 includes body 32 having a top surface 34 and a bottom surface 36. A proximate end 38 of the body terminates in a dial indicator 40, while a distal end 42 of the body includes a leveling portion 44. Saw gauge 16 further includes a cradle 46 and a centering device 48. In a preferred embodiment, two centering devices are utilized, however one of ordinary skill in the art will immediately recognize that any suitable centering device may be used and is within the spirit and scope of the invention as claimed.

Bottom surface 36 also includes a plurality of peaks 50 staggered with a plurality of valleys 52. Peaks 50 and valleys 52 operate to provide a coarse adjustment depending upon the distance between the miter gauge slot and the object being measured. Further, the peaks and valleys are sized and shaped in a generally triangular shape to allow cradle 46 to rest between any two peaks 50 as described in greater detail below.

Proximate end 38 of body 32 includes a recessed portion 54 and defines a through hole 56. A screw 58 is inserted into through hole 56 and a mounting bracket 60. Mounting bracket 60 is integral to dial indicator 40. The dial indicator is held in place with nut 62 threaded on screw 58. Further, a washer 64 is located between a head of the screw and body 32, between the body and mounting bracket 60, and between mounting bracket 60 and nut 62. Accordingly, the dial indicator is rotatable about screw 58 and can be locked in place by locking nut 62 against mounting bracket 60.

Leveling portion 44 consists of a generally concave opening 66 formed in distal end 42 and a leveling rod 68 secured within the generally concave opening with screws 70. Counterweight 68 preferably includes a pair of grooves 72 machined in the circumference and spaced apart approximately the same distance as screws 70. Specifically, screws 70 ride within grooves 72 and prevent counterweight 68 from moving side-to-side or from coming out of opening 66.

Cradle 46 includes a base 74 intermediate a pair of shoulders 76. In a preferred embodiment, both base 74 and shoulders 76 are cylindrical in shape and base 74 has a threaded opening on each end. Base 74 also has a length A slightly longer than the width of body 32 and centering device 48. Shoulders 76 are secured to body 74 with a bolt 78. Further, shoulders 76 extend radially outward of base 74 in order to prevent relative axial movement of body 32 and centering device 48 as will be discussed in greater detail below.

Centering device 48 is a pair of pins 80 in a preferred embodiment. Each pin has a length B approximately equal to the width of body 32 and slightly smaller than length A of base 74. Pins 80 are each generally cylindrical in shape and smaller than cradle 46. Further, each pin has a diameter C of approximately 0.25 inches in a preferred embodiment, although any suitable diameter may be used and is within the spirit and scope of the present invention as claimed.

Having described the structure of the preferred embodiment, a preferred method of operation will be described in detail and should be read in light of FIGS. 1 though 14 and particularly FIGS. 4 through 14.

Figure 4:
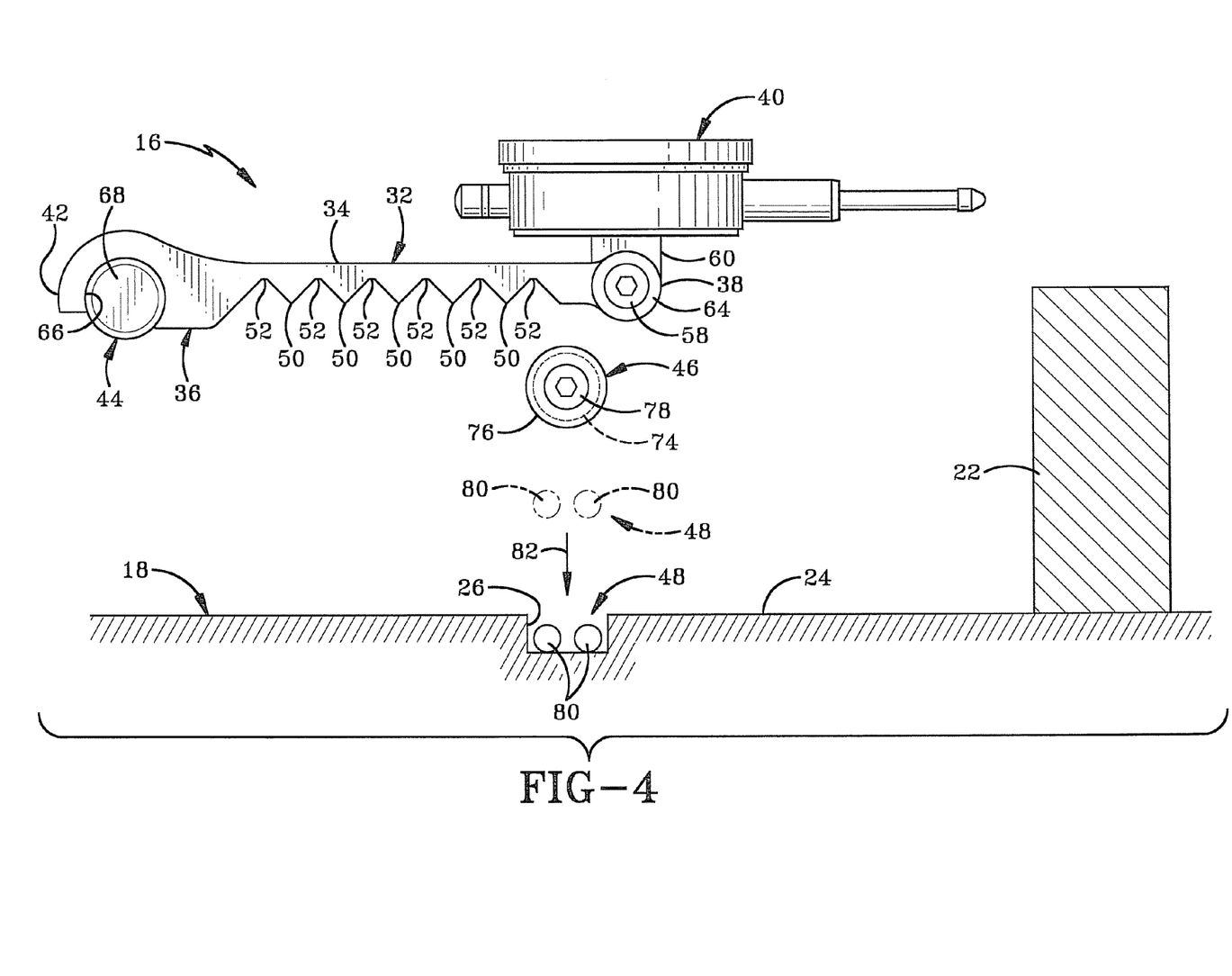
FIG. 4 is a right plan view of a preferred embodiment saw gauge being located on alignment pins within a miter gauge slot.

FIGS. 4 through 9 and particularly FIG. 4 illustrate the arrangement of the components and particularly how centering device 48, cradle 46, and body 32 are aligned in order to provide a measurement. Initially, centering device 48 is located within miter gauge slot 26. Next, cradle 46 is lowered in the direction associated with arrow 82 until the cradle is resting on the centering device.

Figure 5:
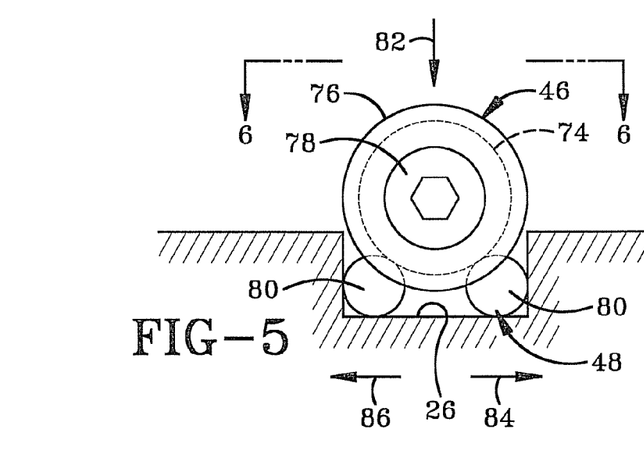
FIG. 5 is a right plan view of a preferred embodiment alignment pins and cradle being located within a miter gauge slot.
Figure 6:
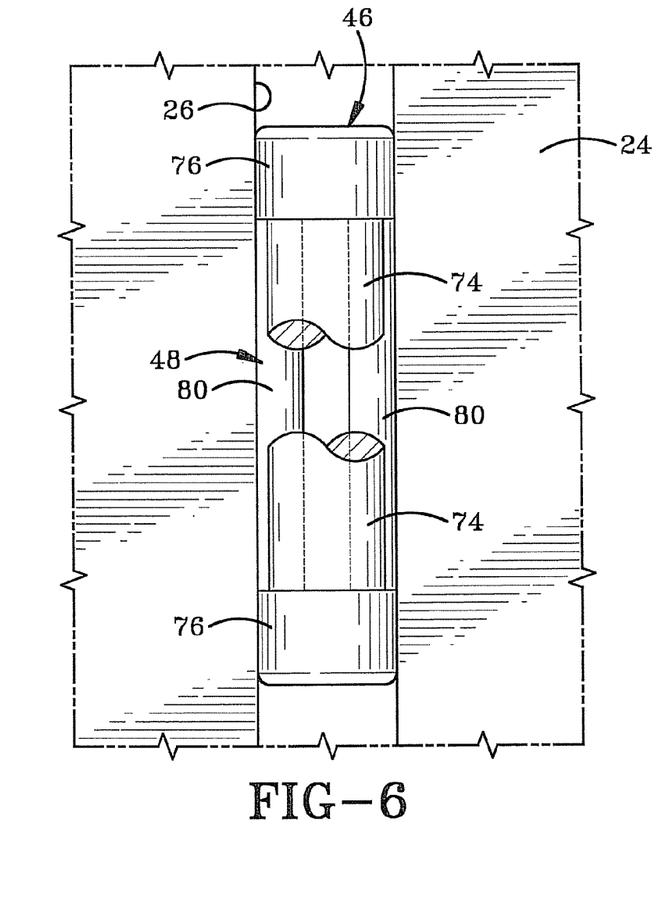
FIG. 6 is a top plan view of a preferred embodiment cradle located on alignment pins within a miter gauge slot.

In accordance with another main feature of the invention and seen in FIG. 5, when cradle 46 is located on pins 80 of centering device 48, pins 80 are each forced in opposite directions. Specifically, one pin is forced in the direction of arrow 84, while the other pin is forced in the opposite direction as indicated by arrow 86. In FIG. 6, pins 80 are seen located completely within shoulders 76 of cradle 46.

Figure 7:
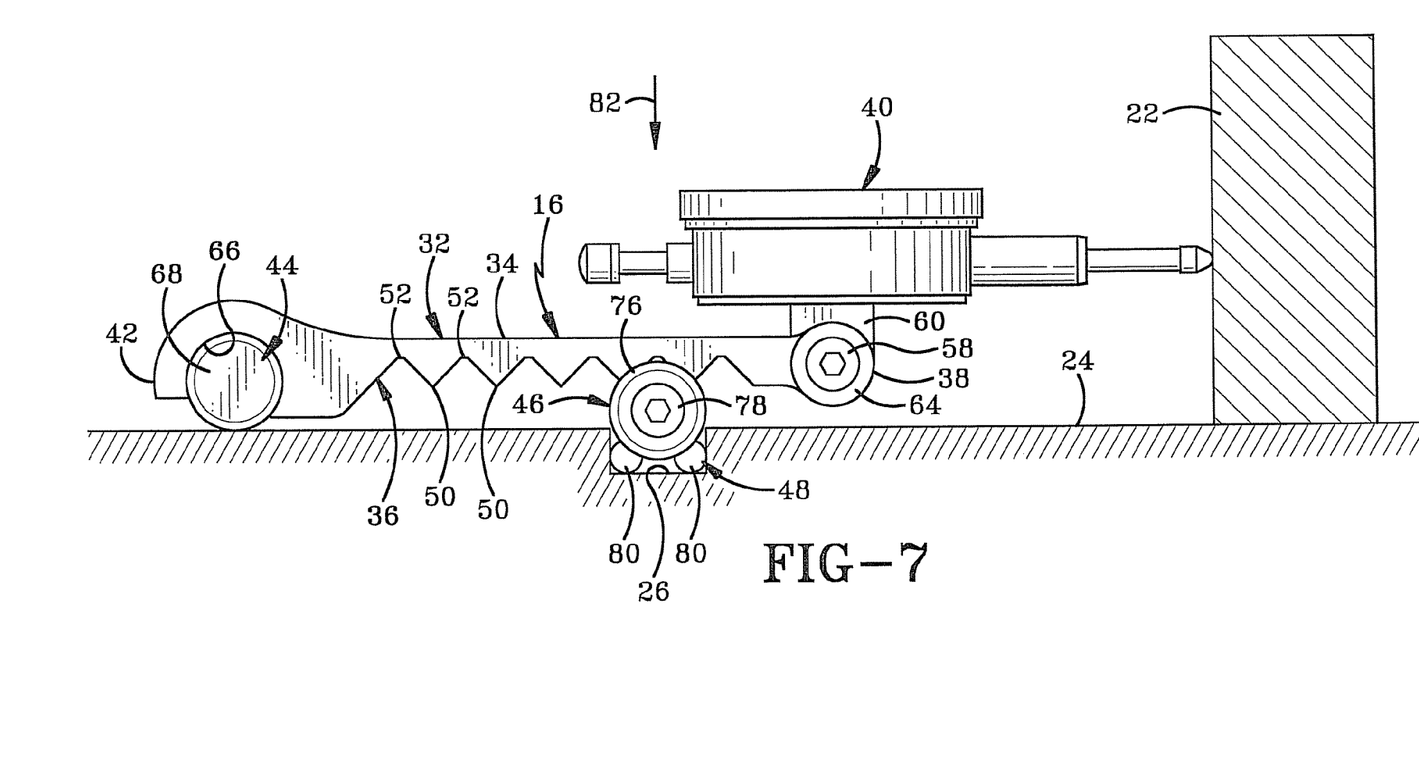
FIG. 7 is a right plan view of a preferred embodiment saw gauge located on alignment pins and a cradle and measuring alignment of a table fence.
Figure 8:
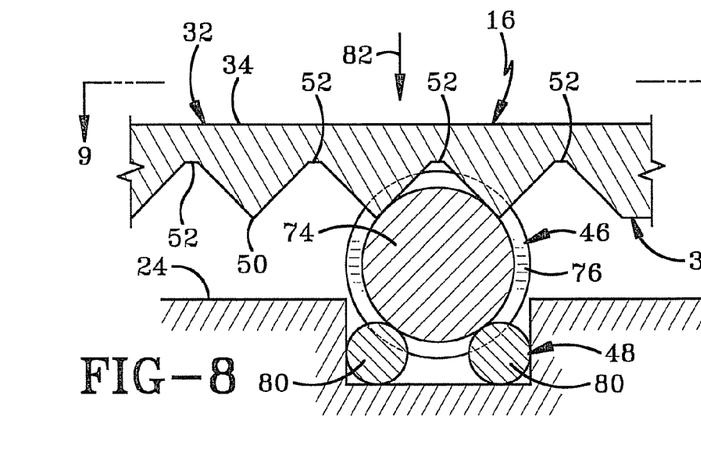
FIG. 8 is a right plan view of a preferred embodiment saw gauge located on alignment pins and a cradle with portions shown in section.
Figure 9:
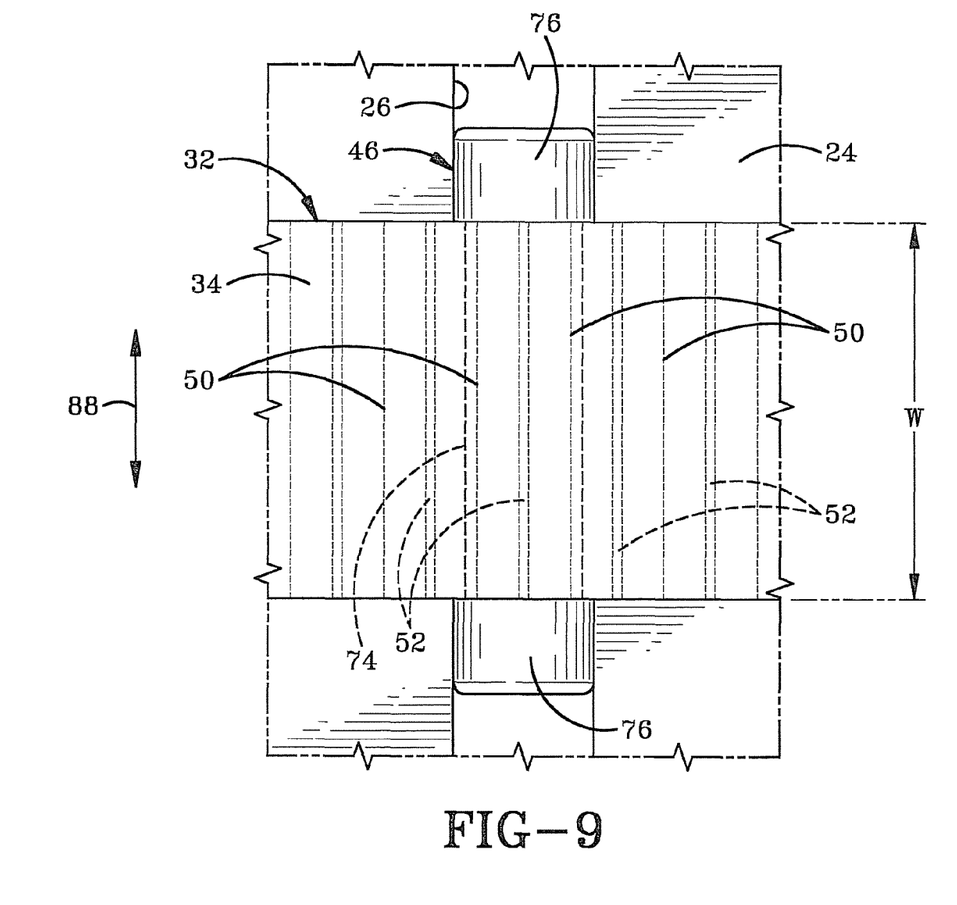
FIG. 9 is a top plan view of a portion of a preferred embodiment saw gauge located on alignment pins and a cradle with portions of the body shown in dashed lines.

Next, body 32 is located on cradle 46, as seen in FIGS. 7 and 8. Further, if pins 80 of centering device 48 were not separated completely when cradle 46 was placed on them, then the additional weight of body 32 will further propel pins 80 in opposite directions. Advantageously, the weight and arcuate shape of body 32, cradle 46, and centering device 48 force pins 80 to the outer edge of miter gauge slot 26 while cradle 46 remains continuously centered and tangentially engaged between the pins. Further, as illustrated in FIG. 9, body 32 preferably has a width W slightly smaller than a length A of the cradle. Advantageously, relative movement of body 32 in the directions associated with arrows 88 are restricted by shoulders 76. In accordance with yet another main feature of the invention body 32, cradle 46 and centering device 48 all move as a single unit in the directions associated with arrows 88.

Figure 10:
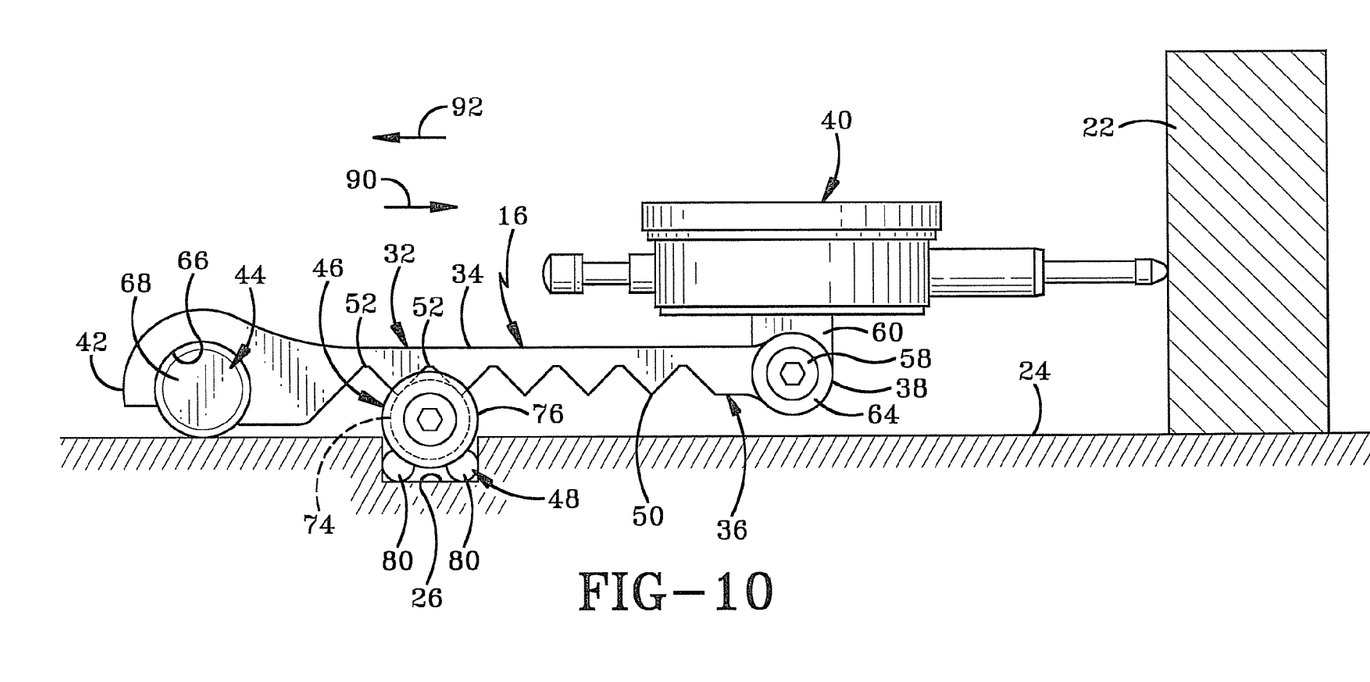
FIG. 10 is a right plan view of a preferred embodiment saw gauge being moved towards a table fence.

FIG. 10 illustrates measurement of parallelism of table fence 22, although the steps taken are equally applicable to measurement of a saw blade or any other item. One of the next steps is moving body 32 in the direction associated with arrow 90, or arrow 92 if necessary, until dial indicator 40 is in sufficient contact to provide a range of measurements. Specifically, dial indicator 40 must be sufficiently depressed so that it can provide measurement of distances in directions associated with both arrows 90 and 92. In addition, body 32 is moved until one of valleys 52 rests on base 74 of cradle 46.

Figure 11:
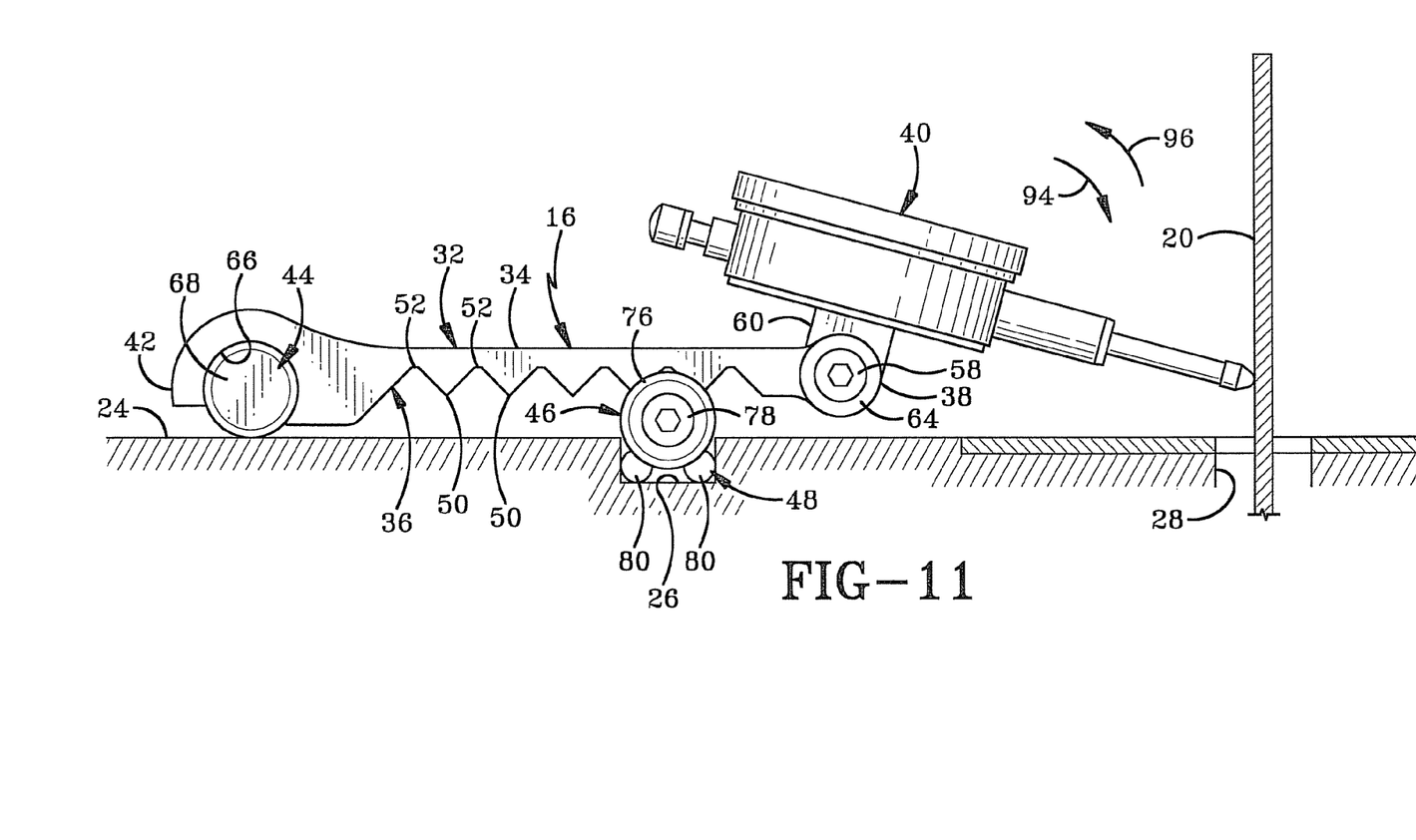
FIG. 11 is a right plan view of a preferred embodiment saw gauge being rotated downwards towards a lower portion of a table saw blade.

FIG. 11 illustrates measurement of parallelism of saw blade 20, although the steps taken are equally applicable to measurement of a table fence or any other item. The next step, if necessary, is rotating dial indicator 40 about screw 58 in the direction associated with arrow 94 or arrow 96 until a consistent measurement can be taken along the length of saw blade 20 or the item to be measured. This additional step may be necessary since body 32 may be at an angle due to counterweight 68 being in contact with work surface 24. Further, this step is used in the measurement of saw blade 20 to insure that the full length of the blade can be measured while avoiding contact with teeth of the saw blade. In particular, counterweight 68 preferably remains in contact with work surface 24 throughout the measuring process to maintain a consistent angle between the dial indicator and the item being measured.

Figure 12:
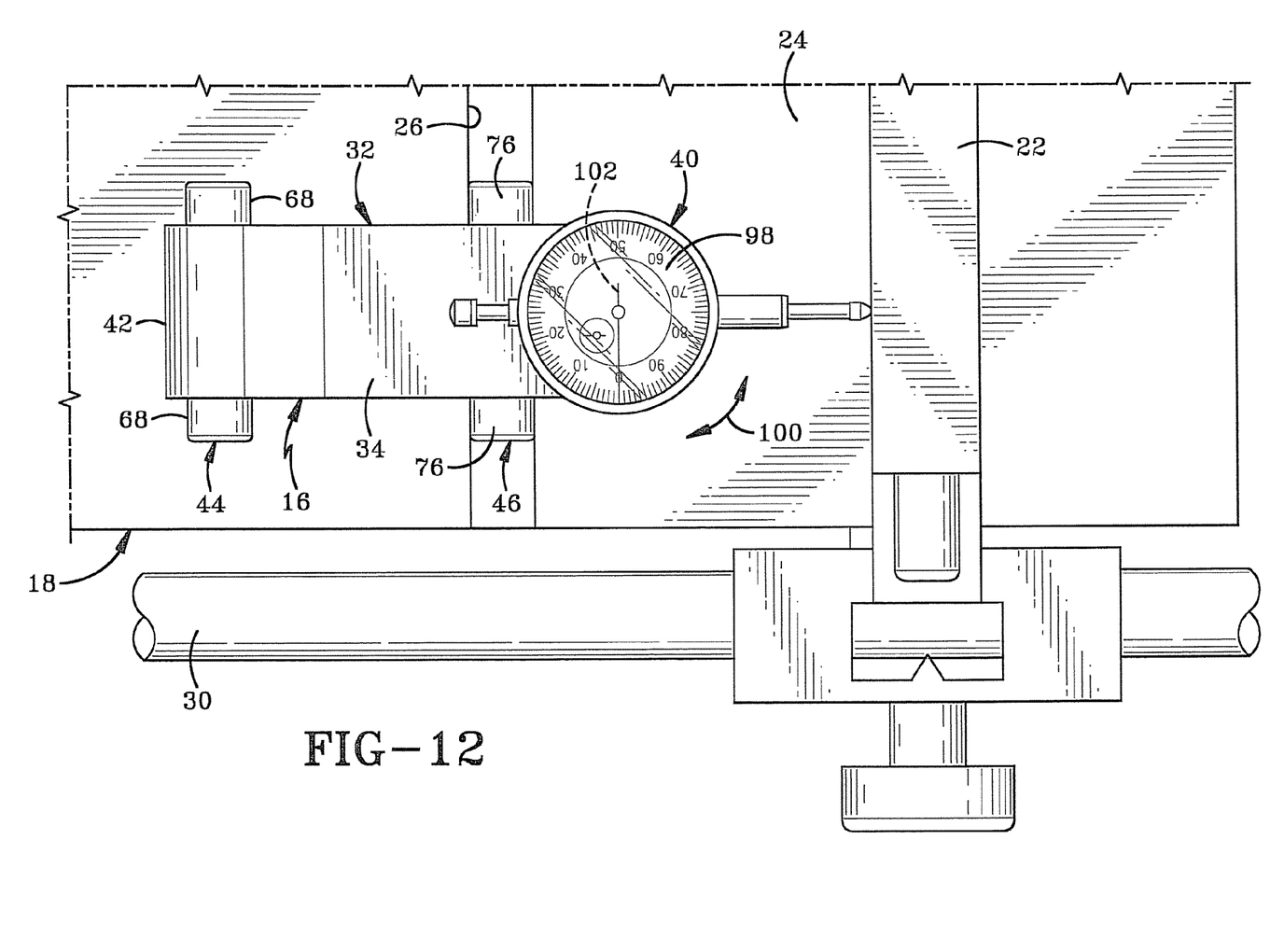
FIG. 12 is a top plan view of a preferred embodiment saw gauge dial indicator being rotated to provide a reference point.

FIG. 12 illustrates the next step of zeroing the dial indicator. In a preferred embodiment, the dial indicator includes a rotatable outer dial face 98 which can be rotated in either direction as indicated by arrows 100. The operator will rotate dial face 98 until an arm 102 is aligned with the "0" of the dial face. In an alternative embodiment, a digital indicator could be used, in which case the operator would merely depress the "zero" button. Either option allows the operator to "zero" the gauge or provide an initial reference point from which to measure the taper of the object being measured.

Figure 13:
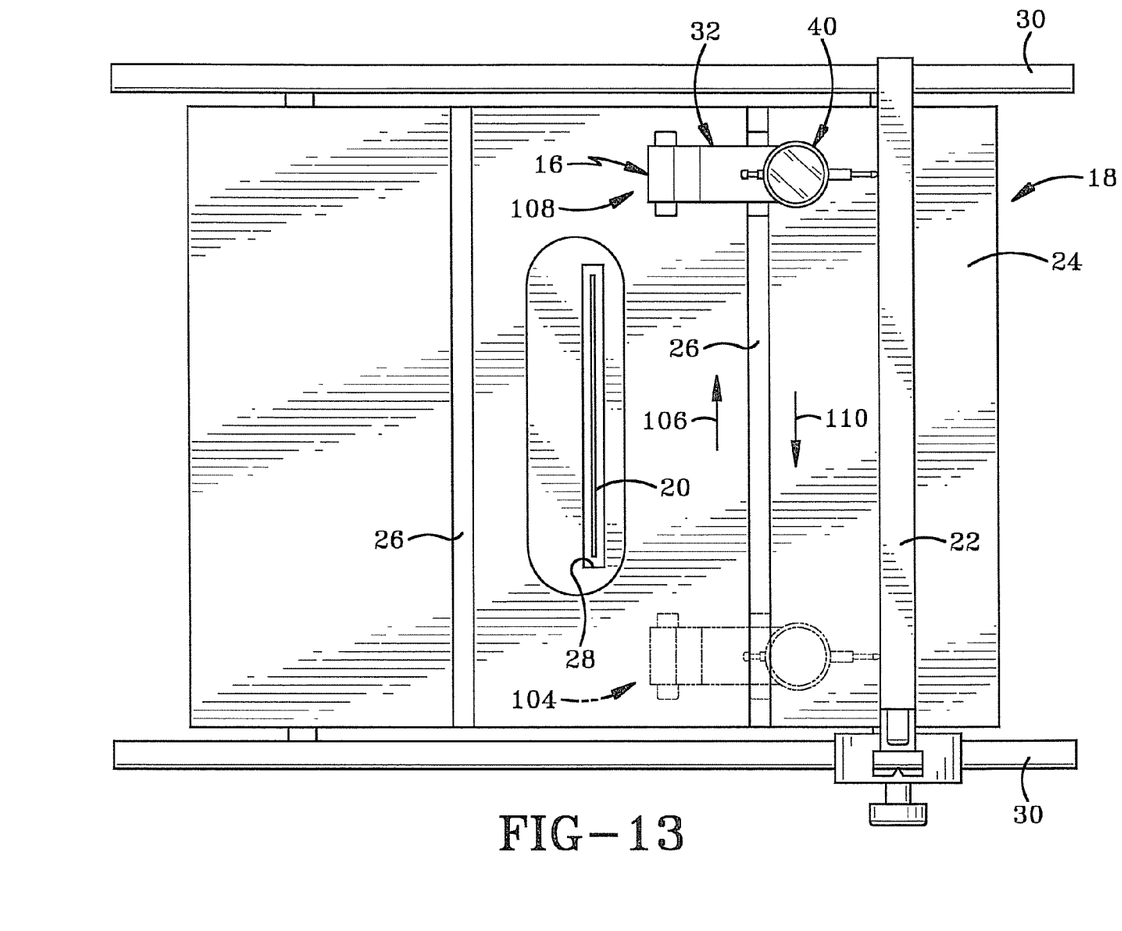
FIG. 13 is a top plan view of a preferred embodiment saw gauge being used to measure alignment of a table saw fence; and, FIG. 14 is a top plan view of a preferred embodiment saw gauge being used to measure alignment of a table saw blade.
Figure 14:
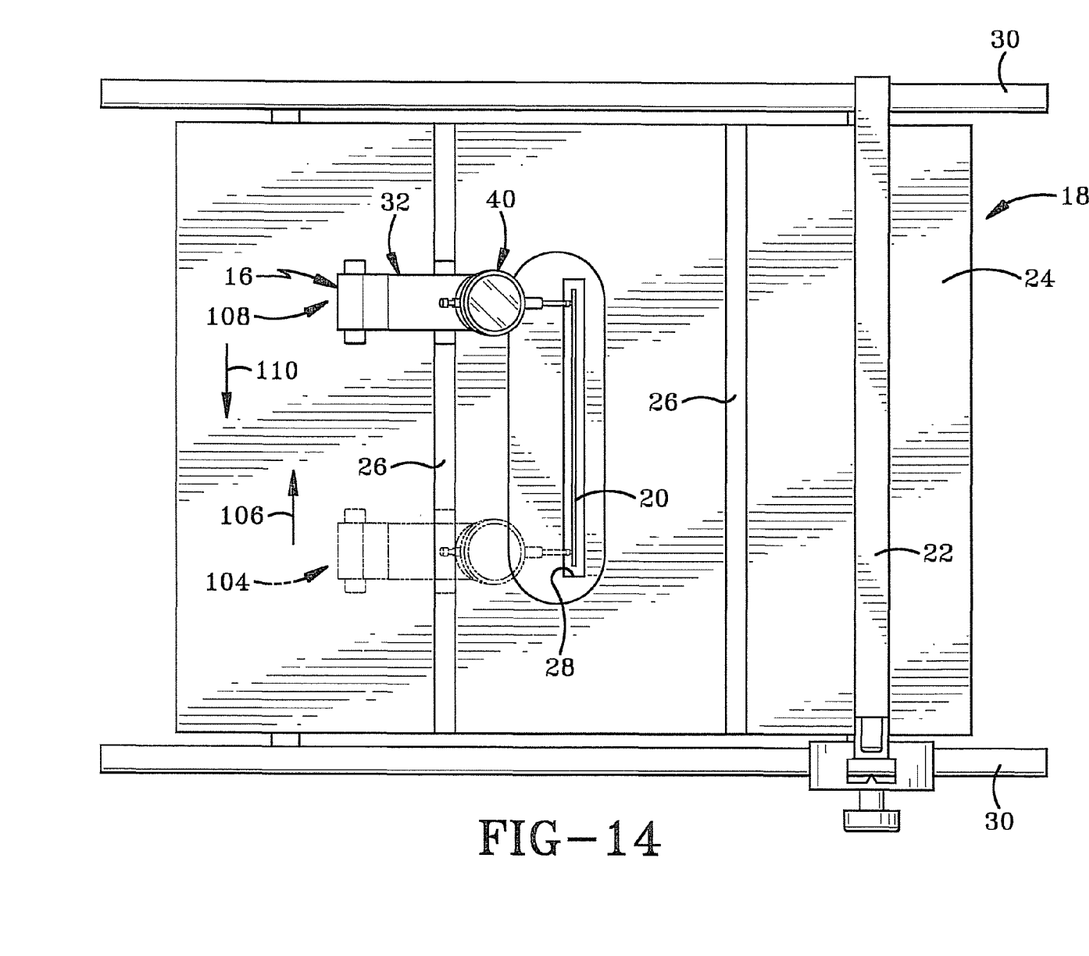

FIGS. 13 and 14 illustrate the measurement of table fence 22 and saw blade 20, respectively. In particular, saw gauge 16 is arranged in a first position 104 after the dial indicator is zeroed. The operator moves saw gauge 16 as a single unit in the direction associated with arrow 106 until a second position 108 is reached. Further, the operator may move the saw gauge in the direction associated with arrow 110 to verify the measurements. Although specific directions are indicated, the operator may move saw gauge 16 in either direction to obtain the item's parallelism without departing from the spirit and scope of the present invention as claimed.

During the movement in the direction of arrows 106 or 110, the operator must pay special attention to the dial indicator to determine if the table saw, fence, or other item is not properly aligned. If the item is not properly aligned, the operator will make any necessary adjustments and repeat the movement in the direction of arrows 106 or 110 until the item is properly aligned.

In summary, saw gauge 16 includes body 32 with valleys 52 for alignment with cradle 46 and centering device 48. The centering device and cradle ensure that body 32 is properly aligned during the measurement process and that a consistent measurement is achieved. The alignment method includes the steps of locating centering device 48 within miter gauge slot 26, locating cradle 46 on the centering device, locating body 32 on the cradle, zeroing dial indicator 40 to obtain a reference point, moving the centering device, cradle, and body together as a single unit along the miter gauge slot length to a second position, and obtaining any dial indicator measurements from the movement to a second position.

Accordingly, the saw gauge is an effective, safe, inexpensive, and efficient device that achieves all the enumerated objectives of the invention, provides for eliminating difficulties encountered with prior art devices, systems, and methods, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the saw gauge is constructed and used, the characteristics of the construction, and the advantageous new and useful results obtained; the new and useful structures, devices, elements, arrangement, parts, combinations, and methods are set forth in the appended claims.

The invention claimed is:

1. A gauge for aligning one of a saw blade and a table fence on a table saw which includes a miter gauge slot in a work surface, said gauge comprising:
   a body having a bottom surface;
   a centering device having a longitudinal axis and being adapted to be received within the miter gauge slot such that the centering device's longitudinal axis is substantially parallel to a longitudinal axis of the miter gauge slot, and wherein the centering device is adapted to rotate within the miter gauge slot about the centering device's longitudinal axis;
   a cradle supported on the centering device and located between the body and the centering device; and,
   wherein the body of the saw gauge rides on the cradle during operation.

2. The gauge as defined in claim 1, wherein both of the centering device and the cradle are generally cylindrical in shape.

3. The gauge as defined in claim 2, wherein the cradle is rotatable relative to the centering device and the body when the body of the saw gauge is moved toward and away from the one of the saw blade and the table fence.

4. The gauge as defined in claim 3, wherein the cradle has a longitudinal axis that is parallel to the longitudinal axis of the centering device; and wherein the cradle rotates about the cradle's longitudinal axis in response to the movement of the body.

5. The gauge as defined in claim 1, wherein the centering device comprises a pair of generally cylindrical pins that are aligned parallel to each other, and each pin is adapted to rotate about a longitudinal axis that is parallel to the longitudinal axis of the miter gauge slot.

6. The gauge as defined in claim 1, wherein during operation, the body is reciprocally movable over the cradle in a direction that is substantially at right angles to a longitudinal axis of the cradle.

7. The gauge as defined in claim 1, further comprising a dial indicator disposed on the body, and wherein the dial indicator includes an arm that extends outwardly therefrom and is adapted to engage one of the saw blade and the table fence disposed on the work surface, and wherein the arm is reciprocally movable with respect to the dial indicator.

8. The gauge as defined in claim 1, further comprising a counterweight disposed proximate a first end of the body and a dial indicator disposed proximate a second end of the body, and wherein the cradle is engaged with the body at any one of a plurality of positions disposed between the counterweight and the dial indicator.

9. The gauge as defined in claim 1, wherein the bottom surface of the body includes a plurality of slots spaced apart from each other and oriented substantially parallel to a longitudinal axis of the cradle, and wherein the cradle is receivable within any one of the plurality of slots in the bottom surface of the body during operation of the gauge.

10. The gauge as defined in claim 9, wherein each of the slots in the bottom surface of the body is substantially V-shaped in cross-section.

11. A method of aligning a saw blade or a table fence comprising the steps of:
   locating a centering device within a miter gauge slot such that a longitudinal axis of the centering device is oriented substantially parallel to a longitudinal axis of the slot;
   locating a cradle on the centering device such that a longitudinal axis of the cradle is oriented substantially parallel to the longitudinal axis of the centering device;
   locating a body which includes a measurement portion, on the cradle such that a longitudinal axis of the body is disposed at right angles to the longitudinal axis of the cradle, and the body is positioned such that the cradle is between the centering device and the body;

sliding the body over the cradle in a direction perpendicular to the longitudinal axis of the cradle;

engaging the measurement portion with one of the table saw and the table fence to achieve a reference distance;

sliding the centering device, the cradle, and the body longitudinally along the miter gauge slot length to a second position;

engaging the measurement portion with the one of a table saw and the table fence at the second position to achieve a second reference distance; and adjusting the position of the one of the table saw and the table fence to equalize the first and second reference distances.

12. The method of claim 11, wherein the step of locating a centering device in the miter gauge slot includes the step of locating a pair of pins parallel to each other within the miter gauge slot such that a longitudinal axis of each pin is disposed parallel to the longitudinal axis of the slot.

13. The method of claim 12, further comprising the step of displacing the pins in directions 180° from each other by providing a downward force on the cradle.

14. A method of aligning a component on a work surface of a table saw, wherein the method comprises the steps of:
  a) providing a saw gauge for measuring distance;
  b) positioning a centering device of the saw gauge in a first position in a miter gauge slot provided in the work surface;
  c) rotating a cradle of the saw gauge on the centering device to move the body of the saw gauge in a direction one of toward and away from the component to be aligned;
  d) measuring a first distance between the miter gauge slot and the component using an indicator on the saw gauge;
  e) moving the saw gauge longitudinally along the miter gauge slot to a second position;
  f) rotating the cradle of the saw gauge on the centering device to move the body of the saw gauge in a direction one of toward and away from the component to be aligned;
  g) measuring a second distance between the miter gauge slot and the component using the indicator on the saw gauge when the saw gauge is in the second position; and
  h) comparing the first and second distances.

15. The method as defined in claim 14, further comprising the steps of:
  i) adjusting a location of at least a portion of the component relative to the work surface if there is a difference between the first and second distances; and
  j) repeating steps b) through i) until the first and second distances are substantially equal.

16. The method as defined in claim 14, further comprising the step of:
  zeroing the indicator on saw gauge before measuring the first distance.

17. The method as defined in claim 14, wherein step b) includes the steps of:
  positioning a pair of cylindrical pins within the miter gauge slot;
  aligning the pins so that they are substantially parallel to a longitudinal axis of the miter gauge slot and substantially parallel to each other.

18. The method as defined in claim 17, further comprising the steps of:
  resting the cradle tangentially on the pins such that a longitudinal axis of the cradle is substantially parallel to the longitudinal axis of the miter gauge slot; and
  engaging the pins between two longitudinally spaced apart shoulders on the cradle.

19. The method of claim 18, further comprising the step of:
  positioning the body of the saw gauge on an arcuate upper surface of the cradle.

20. The method of claim 19, further comprising the step of:
  engaging the cradle in a slot in a bottom surface of the body, where the slot is oriented substantially parallel to the longitudinal axis of the cradle and at right angles to a longitudinal axis of the body.

21. The method of claim 20, wherein the step of engaging the cradle in a slot in the bottom surface of the body further includes the step of:
  sliding the body laterally over the cradle until the cradle becomes engaged in one of a plurality of longitudinally slots provided in the bottom surface of the body.

22. The method of claim 14, wherein the steps of measuring either of the first and second distances includes the steps of:
  contacting a wall of the component to be aligned with an arm of a dial indicator on the saw gauge.

23. The method of claim 22, wherein the step of contacting the wall further includes the step of:
  depressing the arm of the dial indicator inwardly to a point that no further inward motion is possible.

24. The method as defined in claim 22, further comprising the step of:
  rotating the dial indicator about a longitudinal screw that secures the dial indicator to a body of the saw gauge.

25. The method as defined in claim 24, wherein the step of rotating the dial indicator includes the step of:
  maintaining a consistent angle between a tip of arm of the dial indicator and the wall of the component.

26. The method as defined in claim 25, wherein the step of maintaining a consistent angle further includes:
  keeping a counterweight on the body constantly in contact with the work surface during the alignment of the component using the saw gauge.

27. The method as defined in claim 14, further comprising the step of:
  locking the component in its location relative to the work surface when the first and second distance measurements are substantially equal.

* * * * *